(Model.)
2 Sheets—Sheet 1.
A. MILLER.
SEEDING MACHINE.
No. 288,471.  Patented Nov. 13, 1883.
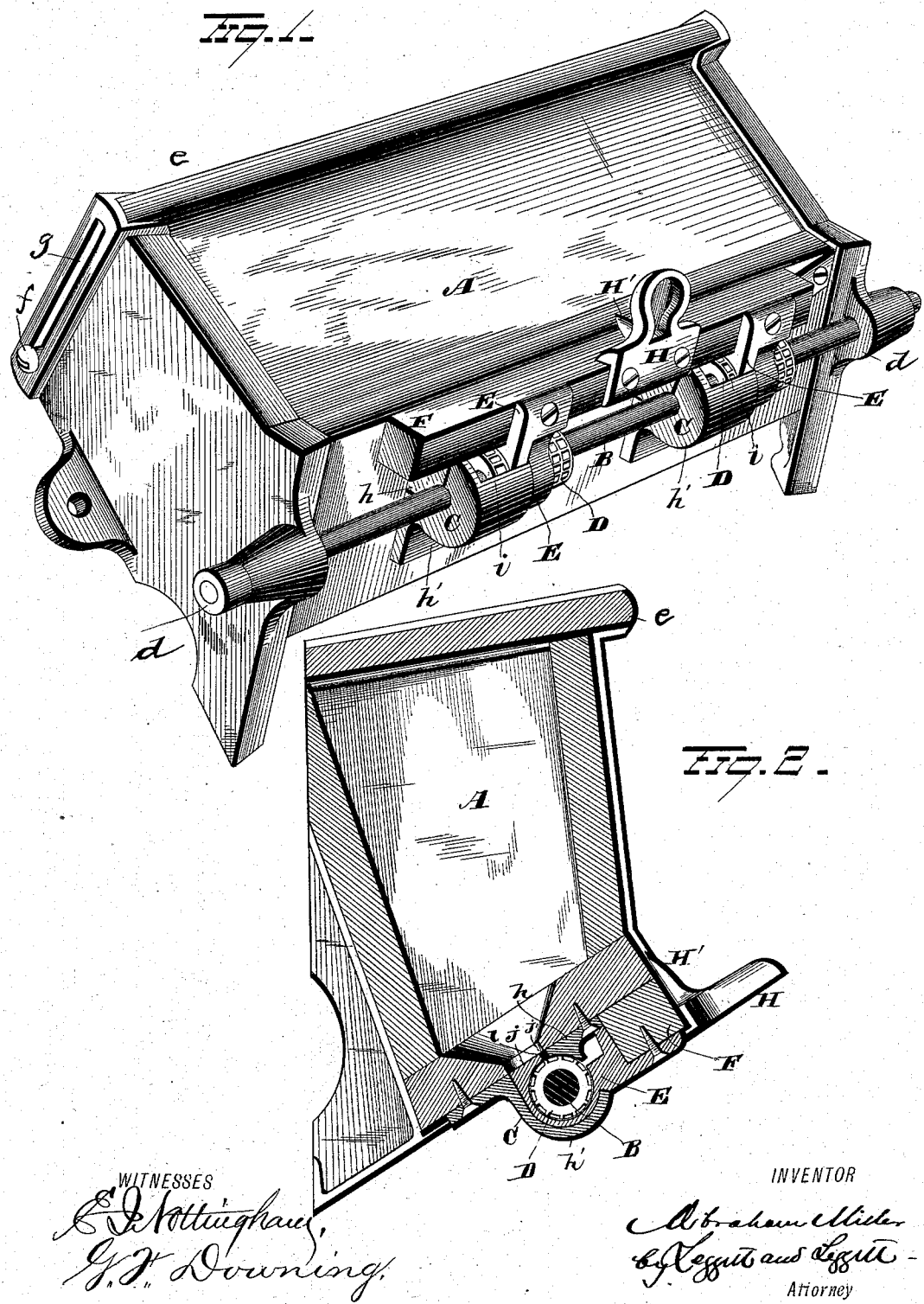
WITNESSES
INVENTOR

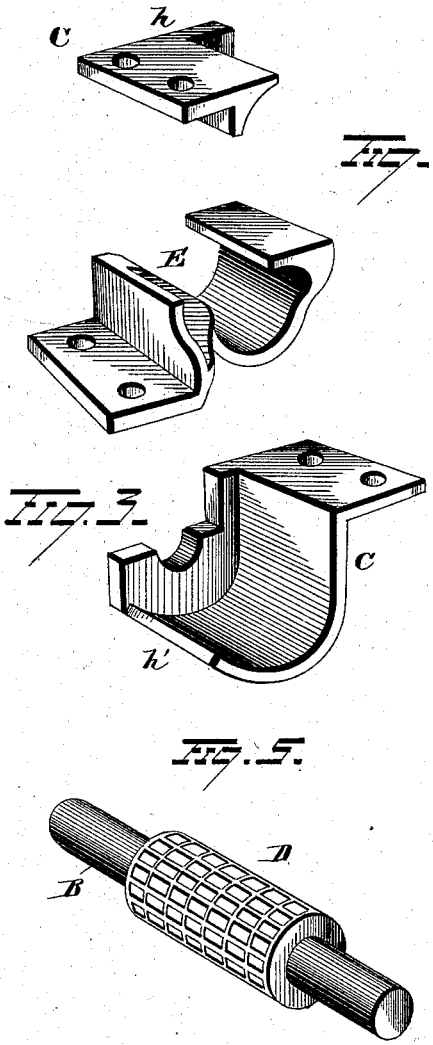

UNITED STATES PATENT OFFICE.

ABRAHAM MILLER, OF NEWARK, OHIO, ASSIGNOR TO THE NEWARK MACHINE COMPANY, OF SAME PLACE.

SEEDING-MACHINE.

SPECIFICATION forming part of Letters Patent No. 288,471, dated November 13, 1883.

Application filed April 23, 1883. (Model.)

*To all whom it may concern:*

Be it known that I, ABRAHAM MILLER, of Newark, in the county of Licking and State of Ohio, have invented certain new and useful Improvements in Force-Feed Seeding-Machines; and I do hereby declare the following to be a full, clear, and exact description of the invention, such as will enable others skilled in the art to which it appertains to make and use the same.

My invention relates to an improvement in force-feed seeding-machines, the object of the same being to provide positive and regular means for discharging the seed without crushing or otherwise injuring them; and with this end in view my invention consists in the parts and combinations of parts, as will be more fully described, and pointed out in the claims.

In the accompanying drawings, Figure 1 is a view in perspective of the seed-box. Fig. 2 is a transverse vertical view through one of the feed-cups. Fig. 3 is a detached perspective view of the feed-cup. Fig. 4 is a similar view of the cut-off. Fig. 5 is a similar view of the feed-wheel.

The seed-hopper A is composed of the metal end pieces, $a$, each of which latter is provided with the flanges $b$ and lugs $c$, between which the ends of the bottom and front and rear pieces of the seed-hopper rest, where they are secured by screws which pass through the end pieces between the flanges and lugs. Each end piece is also provided with the bearing $d$ for the shaft B, and with the oblong slides for the cover $e$, which latter is retained against displacement by the screws $f$, which pass through the oblong slots $g$ and prevent the complete withdrawal of the cover. This hopper is secured to the frame of the machine in any suitable manner, and the shaft B is geared with the ground-wheels or axle by suitable pinions, which latter impart the necessary rotary motion thereto. The bottom of the hopper A is provided at suitable intervals apart with seed-openings, under which the feed-cups C are secured. These cups are made in two parts, one of which is adapted to be secured to the hopper above the shaft, while the other portion overlaps the shaft and forms the bottom for the cup. These two portions $h$ and $h'$, when secured in position, closely embrace the shaft on one side, while the opposite side is open for the entrance of the cut-off. The lower portion, $h'$, of the cup is rounded, so as to conform in shape to the feed-wheel, and when secured in position an open space, $i$, is left between it and the plate $j$, through which the seed passes. The shaft B passes under the hopper, and is provided with a feed-wheel for each seed-cup. These wheels D are made of rubber or other suitable elastic material, and are each provided with pockets or grooves on its periphery, to enable it to engage the seed and carry it upward to the discharge-opening $i$. The seed or grain falls from the hopper into the seed-cups in front of the feed-wheel, and is engaged by the said wheel and carried under the same, and then upward to the discharge-opening, the elasticity of the wheel enabling it to yield, thereby insuring a positive and regular action of the parts without danger of clogging, and consequently crushing the seed. The cut-offs E are secured to the sliding bar F so as to register with the feed-cups, and adapted to be moved in and out thereof simultaneously with the movement of the bar. These cut-offs are shaped so as to move between the portion $h'$ of the feed-cups and the feed-wheel, and each terminates in a plate, $j$, which latter comes directly under its respective opening in the hopper, for the purpose of wholly or partly cutting off the supply. By moving the bar F to the right until the end thereof strikes the stop, the discharge-ports are opened, and by reversing the movement they are wholly or partly closed, to suit circumstances. The cut-offs form one side of the seed-cup and prevent any grain from escaping except through the proper channel, and are adapted to be moved longitudinally, but are prevented from turning therein by the shoulders $l$, which latter abut against free edge of the plate $j'$. The bar F is secured to these cut-offs, and is operated by the handle H, which latter is provided with an upwardly-extending pointer, H', adapted to act in conjunction with a graduated scale, for the purpose of regulating the discharge. From the foregoing it will be seen that by simply moving the sliding bar longitudinally all of the discharge-openings are simultaneously opened or closed, and by substituting the elastic wheel for the rigid metallic wheel now universally employed in all force-feed machines, the grain is fed regularly and in uniform quantities, and the danger of crushing the seed between the wheel and the feed-cup entirely obviated.

This device is exceedingly simple in construction, is durable in use, and can be manufactured at a small initial cost.

It is evident that numerous ways can be devised for securing the elastic wheels to the shaft, as well as numerous changes in the details of construction of the several parts, and hence I would have it understood that I do not confine myself to the exact construction shown and described, but consider myself at liberty to make such slight changes as fairly fall within the spirit and scope of my invention.

Having fully described my invention, what I claim as new, and desire to secure by Letters Patent, is—

1. The combination, with the two-part seed-cup rigidly secured beneath the hopper, and provided with an open end, of a non-adjustable feed-wheel adapted to rotate within the seed-cup, and a sliding cut-off, E, constructed and arranged substantially as described, whereby it is adapted to encircle a portion of the feed-wheel, and extend upwardly and regulate the width of the discharge-openings in both the hopper and the seed-cup, and to close the open end of the seed-cup, substantially as set forth.

2. The combination, with the two-part seed-cup rigidly secured to the hopper and provided with an open end, and a non-adjustable feed-wheel adapted to rotate within the feed-cup, of a sliding cut-off constructed and arranged to encircle a part of the feed-wheel, and extend upwardly and regulate the width of the discharge-openings in both the hopper and seed-cup, and the scale and pointer, to indicate the position of the sliding cut-off, substantially as set forth.

In testimony whereof I have signed this specification in the presence of two subscribing witnesses.

ABRAHAM MILLER.

Witnesses:
   A. R. APPLEMAN,
   GEO. D. GRASSER.